US011753544B2

(12) United States Patent
Garcia et al.

(10) Patent No.: US 11,753,544 B2
(45) Date of Patent: Sep. 12, 2023

(54) INSULATION PRECURSORS, ROCKET MOTORS, AND RELATED METHODS

(71) Applicant: Northrop Grumman Systems Corporation, Falls Church, VA (US)

(72) Inventors: Benjamin W. C. Garcia, Tremonton, UT (US); Robert S. Larson, Harrisville, UT (US)

(73) Assignee: Northrop Grumman Systems Corporation, Falls Church, VA (US)

(*) Notice: Subject to any disclaimer, the term of this patent is extended or adjusted under 35 U.S.C. 154(b) by 279 days.

(21) Appl. No.: 17/084,353

(22) Filed: Oct. 29, 2020

(65) Prior Publication Data
US 2021/0061999 A1 Mar. 4, 2021

Related U.S. Application Data

(62) Division of application No. 16/045,352, filed on Jul. 25, 2018, now Pat. No. 10,870,757.

(51) Int. Cl.
| | | |
|---|---|---|
| *C08L 83/02* | (2006.01) | |
| *F02K 9/32* | (2006.01) | |
| *C08K 7/28* | (2006.01) | |
| *C08K 7/06* | (2006.01) | |
| *C09J 183/04* | (2006.01) | |
| *C08J 5/04* | (2006.01) | |

(52) U.S. Cl.
CPC ............... *C08L 83/02* (2013.01); *C08K 7/06* (2013.01); *C08K 7/28* (2013.01); *F02K 9/32* (2013.01); *C08J 5/042* (2013.01); *C08K 2201/005* (2013.01); *C09J 183/04* (2013.01)

(58) Field of Classification Search
CPC .. C08L 83/02; C08K 7/06; C08K 7/28; F02K 9/32
See application file for complete search history.

(56) References Cited

U.S. PATENT DOCUMENTS

| | | | |
|---|---|---|---|
| 4,105,455 A | 8/1978 | Koga et al. | |
| 4,220,600 A | 9/1980 | Hasegawa et al. | |
| 4,248,814 A | 2/1981 | Yajima et al. | |
| 4,414,403 A | 11/1983 | Schilling et al. | |
| 4,681,860 A | 7/1987 | Bujalski | |
| 4,719,273 A | 1/1988 | Seyferth et al. | |
| 4,737,552 A | 4/1988 | Baney et al. | |
| 4,921,917 A | 5/1990 | Burns | |
| 5,082,872 A | 1/1992 | Burns et al. | |
| 5,334,414 A | 8/1994 | Edie et al. | |
| 5,356,499 A | 10/1994 | Decker et al. | |
| 5,780,126 A | 7/1998 | Smith et al. | |
| 5,872,070 A | 2/1999 | Dismukes et al. | |
| 6,013,711 A | 1/2000 | Lewis et al. | |
| 6,365,698 B1 | 4/2002 | Goldslager et al. | |
| 7,628,878 B2 | 12/2009 | Riedell et al. | |
| 8,466,076 B2 | 6/2013 | Ruedinger et al. | |
| 8,492,476 B2 | 7/2013 | Monden | |
| 8,604,149 B2 | 12/2013 | Clade et al. | |
| 8,658,755 B2 | 2/2014 | Saito | |
| 8,919,254 B2 | 12/2014 | Diehl et al. | |
| 9,102,571 B2 | 8/2015 | Szweda et al. | |
| 9,412,970 B2 | 8/2016 | Han et al. | |
| 10,322,974 B2 | 6/2019 | Land et al. | |
| 10,731,036 B2 | 8/2020 | Garcia | |
| 10,870,757 B2 * | 12/2020 | Garcia | C08K 7/06 |
| 10,875,813 B2 | 12/2020 | Garcia et al. | |
| 2006/0177686 A1 | 8/2006 | Henager et al. | |
| 2009/0252971 A1 | 10/2009 | Saha et al. | |
| 2009/0324930 A1 | 12/2009 | Tulyani et al. | |
| 2010/0015396 A1 | 1/2010 | Johnson et al. | |
| 2010/0255289 A1 | 10/2010 | Lewinsohn et al. | |
| 2011/0098420 A1 | 4/2011 | Takizawa et al. | |
| 2011/0210344 A1 | 9/2011 | Han et al. | |
| 2011/0318549 A1 | 12/2011 | Schmidt et al. | |
| 2012/0065294 A1 | 3/2012 | Gajiwala et al. | |
| 2014/0255635 A1 | 9/2014 | Morgan et al. | |
| 2014/0356613 A1 | 12/2014 | Weisenberger et al. | |
| 2015/0175750 A1 | 6/2015 | Hopkins et al. | |
| 2015/0284289 A1 | 10/2015 | Gu et al. | |
| 2016/0153288 A1 | 6/2016 | Luthra | |
| 2016/0160664 A1 | 6/2016 | Luthra et al. | |
| 2016/0207781 A1 | 7/2016 | Dukes et al. | |

(Continued)

FOREIGN PATENT DOCUMENTS

| | | | |
|---|---|---|---|
| DE | 102011055285 B3 | 2/2013 | |
| EP | 0718254 A2 | 6/1996 | |

(Continued)

OTHER PUBLICATIONS

Database WPI Week 199220 Thomson Scientific, London, GB; AN 1992-162725 XP002797265, Copyright 2017.
EEMS, LLC "Liquid Polymers" Product Chart, 1 page, eems-llc.com/wp-content/.../ Custom Polycarbosiloxanes and Polycarbosilanes. pdf, accessed Jun. 8, 2017.
EEMS, LLC, "CSO family of Carbosiloxane Polymers" product listing, 2 pages, eems-llc.com, accessed Jun. 8, 2017.
MATECH "Introducing Pre-ceramic Polymers", Distribution A: Approved for Public Release; Distribution is unlimited, 2 pages http://matechgsm.com/brochures/PolymerPamphlet.pdf, accessed Jun. 8, 2017.
StarPCSTM SMP-10, "Silicon Carbide Matrix Precursor" Technical Data, http://www.starfiresystems.com/docs/ceramic-forming-polymers/SMP-10.pdf, accessed Jun. 8, 2017.

*Primary Examiner* — Edward J Cain
(74) *Attorney, Agent, or Firm* — TraskBritt

(57) ABSTRACT

An insulation material includes a matrix comprising a reaction product formed from a silicon carbide precursor resin and a silicon dioxide precursor resin. At least one filler, such as hollow glass microspheres and/or carbon fiber is dispersed within the matrix. A rocket motor includes a case, the insulation material within and bonded to the case, and a solid propellant within the case. An insulation precursor includes a silicon carbide precursor resin, a silicon dioxide precursor resin, and the at least one filler. Related methods are also disclosed.

12 Claims, 1 Drawing Sheet

(56) References Cited

U.S. PATENT DOCUMENTS

| | | |
|---|---|---|
| 2016/0207836 A1 | 7/2016 | Land et al. |
| 2017/0144329 A1 | 5/2017 | Dunn et al. |
| 2019/0016640 A1 | 1/2019 | Garcia et al. |
| 2019/0016892 A1 | 1/2019 | Garcia |
| 2020/0062663 A1 | 2/2020 | Garcia |

FOREIGN PATENT DOCUMENTS

| | | |
|---|---|---|
| EP | 3260434 A1 | 12/2017 |
| JP | 04-100875 A | 4/1992 |

\* cited by examiner

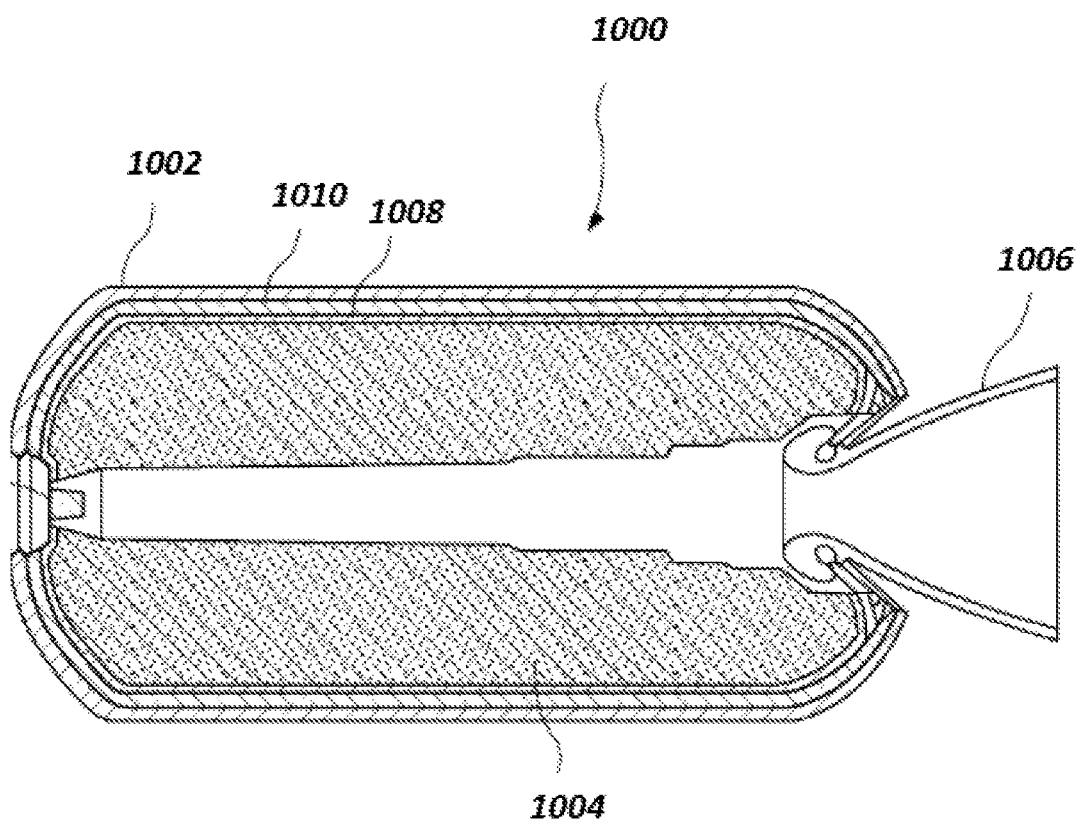

INSULATION PRECURSORS, ROCKET MOTORS, AND RELATED METHODS

CROSS-REFERENCE TO RELATED APPLICATION

This application is a divisional of U.S. patent application Ser. No. 16/045,352, filed Jul. 25, 2018, now U.S. Pat. No. 10,870,757, issued Dec. 22, 2020, the disclosure of which is hereby incorporated in its entirety herein by this reference.

STATEMENT REGARDING FEDERALLY SPONSORED RESEARCH OR DEVELOPMENT

This invention was made with government support under Contract No. ABL W15QKN-14-9-1001-(DOTC-15-01-INIT242), awarded by the Army. The government has certain rights in the invention.

FIELD

Embodiments of the disclosure relate generally to insulation materials that may be used, for example, in rocket motors. More particularly, embodiments of the disclosure relate to insulation materials that include a matrix material and fillers dispersed within the matrix, articles comprising the insulation materials, insulation precursors, methods of forming the insulation materials, and methods of insulating the articles.

BACKGROUND

Rocket motors typically include a propellant within a case. During operation, the propellant burns, and hot gases generated from the burning propellant leave the case through a nozzle, which causes thrust and therefore applies a force to propel the rocket motor.

Rocket motor design entails balancing various operational requirements. For example, the case must be strong enough to withstand the pressure of the gases generated by burning propellant, and insulation must protect the case from thermal damage. However, the case and insulation must also be light enough that thrust propels the rocket motor at an appropriate velocity.

Insulation materials may be selected based upon density, ability to withstand thermal loads, mechanical properties, application methods, toxicity of raw materials, or other properties. Insulation in a solid rocket motor typically contributes a significant amount to the weight of a motor, so any reduction in the amount of insulation can lead to higher performance. For example, reduction of the amount of insulation can lower the overall weight of a motor and/or increase the amount of propellant in the motor, both which can increase performance.

BRIEF SUMMARY

In some embodiments, an insulation material includes a matrix comprising a reaction product formed from a silicon carbide precursor resin and a silicon dioxide precursor resin. At least one filler is dispersed within the matrix. The at least one filler comprises at least one material selected from the group consisting of a low density filler and an ablation enhancement filler.

A rocket motor may include a case, the insulation material within and bonded to the case, and a solid propellant within the case.

In certain embodiments, an insulation precursor includes a silicon carbide precursor resin, a silicon dioxide precursor resin, and at least one filler material selected from the group consisting of a low density filler and an ablation enhancement filler.

A method of forming an insulation material includes combining a silicon carbide precursor resin, a silicon dioxide precursor resin, and at least one filler to form an insulation precursor. The at least one filler comprises at least one material selected from the group consisting of a low density filler and an ablation enhancement filler. The insulation precursor is cured to form an insulation material comprising the at least one filler dispersed within a solid matrix.

A method of insulating a rocket motor includes combining a silicon carbide precursor resin, a silicon dioxide precursor resin, and at least one filler to form an insulation precursor. The at least one filler comprises at least one material selected from the group consisting of a low density filler and an ablation enhancement filler. The insulation precursor is cured to form an insulation material comprising the at least one filler dispersed within a solid matrix. The insulation material is applied to an interior surface of a case of a rocket motor, and a propellant is cast within the case.

BRIEF DESCRIPTION OF THE DRAWINGS

FIG. 1 is a simplified cross-sectional view of a rocket motor including an insulation material in accordance with embodiments of the disclosure.

DETAILED DESCRIPTION

An insulation material that includes hollow glass microspheres and carbon fiber disposed within a matrix is disclosed. The matrix is formed from a silicon carbide precursor resin and a silicon dioxide precursor resin. By way of example only, the insulation material may be a preceramic material that converts to a glassy solid (which may be particularly resistant to oxidation) during exposure to high temperatures (e.g., during use and operation of a rocket motor). The insulation material may have a lower density than conventional Kevlar-filled EPDM (ethylene propylene diene monomer) insulation, and may have comparable or improved performance in certain parameters.

As used herein, the term "insulation precursor" means and includes a formulation of the silicon carbide precursor resin and silicon dioxide precursor resin, along with other optional components or additives, before curing and ceramifying.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a pre-determined way.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

The following description provides specific details, such as materials, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional manufacturing techniques employed in the industry. In addition, the description provided below does not form a complete process flow for manufacturing the articles and compositions. Only those process acts and structures necessary to understand the embodiments of the disclosure are described in detail below. Additional acts to form the articles and compositions may be performed by conventional techniques. Also note, the drawing accompanying the application is for illustrative purposes only, and is thus not drawn to scale.

The insulation material disclosed may be formed from an insulation precursor that comprises a silicon carbide precursor resin, a silicon dioxide precursor resin, a filler (e.g., a low-density filler such as hollow glass microspheres, or an ablation-enhancement filler such as carbon fiber), and, optionally, a crosslinking agent, a catalyst, an adhesion promoter, etc. In some embodiments, the insulation precursor may comprise from about 1% to about 20% silicon carbide precursor resin by weight, such as from about 5% to about 10% by weight, or from about 6% to about 9% by weight. The silicon carbide precursor resin is a polycarbosilane preceramic polymer formed of monomers having the following chemical structure:

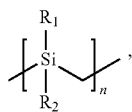

where $R_1$ and $R_2$ of each monomer is independently a hydrogen (H) group, a methyl ($CH_3$) group, or a vinyl group ($CH_2=CH$) and n is an integer from 2 to 10,000 (e.g., from 100 to 5,000). When vinyl groups are present, the vinyl group may be directly bonded to the silicon atom or may be bonded to the silicon atom by an alkyl group or other linker. By way of example only, the alkyl group may include from one carbon atom to six carbon atoms. At least a portion of the monomers in the polycarbosilane preceramic polymer include the vinyl group as $R_1$ or $R_2$ to enable crosslinking with the organically modified silicon dioxide preceramic polymer during cure of the insulation precursor. The number of vinyl groups in the polycarbosilane preceramic polymer may be sufficient to crosslink the insulation precursor. The polycarbosilane preceramic polymer may include at least about 0.01 vinyl eq/kg, such as from about 0.2 vinyl eq/kg to about 5.0 vinyl eq/kg. The polycarbosilane preceramic polymer may also include at least about 0.01 hydride eq/kg, such as from about 0.2 hydride eq/kg to about 10 hydride eq/kg. The polycarbosilane preceramic polymer may be photocurable, chemically curable, or thermally curable.

By selecting the R1 and R2 groups of each monomer and the degree of polymerization (i.e., the number of monomer repeat units), a desired viscosity of the polycarbosilane preceramic polymer may be achieved. The polycarbosilane preceramic polymer is formulated to exhibit a viscosity of less than or equal to about 250 cP at a temperature of about 25° C., such as from about 1 cP to about 250 cP at about 25° C., from about 1 cP to about 200 cP at about 25° C., from about 1 cP to about 100 cP at about 25° C., from about 10 cP to about 250 cP at about 25° C., from about 10 cP to about 200 cP at about 25° C., from about 40 cP to about 250 cP at about 25° C., from about 40 cP to about 200 cP at about 25° C., from about 40 cP to about 120 cP at about 25° C., from about 40 cP to about 100 cP at about 25° C., from about 5 cP to 8 cP at about 25° C., from about 4 cP to about 7 cP at about 25° C., from about 8 cP to about 12 cP at about 25° C., from about 8 cP to about 15 cP at about 25° C., or from about 200 cP to about 250 cP at about 25° C. In some embodiments, the polycarbosilane preceramic polymer has a viscosity from about 40 cP to about 120 cP at about 25° C.

Such polycarbosilane preceramic polymers are commercially available from numerous sources including, but not limited to, EEMS, LLC (Saratoga Springs, N.Y.), Starfire Systems, Inc. (Malta, N.Y.), or Matech (Westlake Village, Calif.). The polycarbosilane preceramic polymer may include, but is not limited to, SMP-10, StarPCS® SMP-500, or StarPCS® SMP-877 silicon carbide precursor resin from Starfire Systems, Inc. Additional polycarbosilane preceramic polymers are commercially available from EEMS, LLC as MS 208, MS 272, MS 250, MS 440, CSO 110, or CSO 116. The polycarbosilane preceramic polymer may also include a combination of polycarbosilane preceramic polymers or a combination of the polycarbosilane preceramic polymer with at least one other polymer, such as a polysiloxane or other compatible polymer. Commercially available polycarbosilane preceramic polymers may also include a combination of the polycarbosilane preceramic polymer.

In some embodiments, the insulation precursor may comprise from about 40% to about 90% silicon dioxide precursor resin by weight, such as from about 50% to about 85% by weight, or even from about 65% to about 80% by weight. The silicon dioxide precursor resin is an organically modified silicon dioxide preceramic polymer formed of monomers having the following chemical structure:

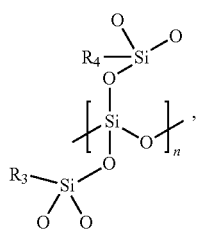

where each of $R_3$ and $R_4$ is independently a methyl ($CH_3$) group or a vinyl group ($CH_2=CH$) and n is an integer from 2 to 10,000 (e.g., from 100 to 5,000). When vinyl groups are present, the vinyl group may be directly bonded to the silicon atom or may be bonded to the silicon atom by an alkyl group or other linker. By way of example only, the alkyl group may include from one carbon atom to six carbon atoms. The organically modified silicon dioxide preceramic polymer includes a quaternary coordinated (QC) oxygen to silicon atom and may also be referred to as a QC silicon dioxide preceramic polymer. At least a portion of the monomers in the organically modified silicon dioxide preceramic polymer may, optionally, include the vinyl group as $R_3$ or $R_4$ to enable crosslinking with the polycarbosilane preceramic polymer during cure of the insulation precursor. The organically modified silicon dioxide preceramic polymer may include from about 0 vinyl eq/kg to about 5.0 vinyl eq/kg, such as from about 0.18 vinyl eq/kg to about 0.3 vinyl eq/kg. The organically modified silicon dioxide preceramic polymer may be photocurable, chemically curable, or thermally curable.

R3 and R4 of each monomer of the organically modified silicon dioxide preceramic polymer and the degree of polymerization are selected to provide the desired viscosity to the organically modified silicon dioxide preceramic polymer. The organically modified silicon dioxide preceramic polymer also has a low carbon content and a high degree of quaternary coordinated oxygen to the silicon atoms in the polymer chain. The organically modified silicon dioxide preceramic polymer is formulated to exhibit a viscosity greater than about 200 cP at a temperature of about 25° C., such as greater than about 2,500 cP at a temperature of about 25° C., from about 3,000 cP to about 100,000 cP at about 25° C., from about 4,000 cP to about 100,000 cP at about 25° C., from about 5,000 cP to about 100,000 cP at about 25° C., from about 6,000 cP to about 100,000 cP at about 25° C., from about 4,500 cP to about 7,000 cP at about 25° C., from about 40,000 cP to about 80,000 cP at about 25° C., from about 45,000 cP to about 75,000 cP at about 25° C., from about 50,000 cP to about 70,000 cP at about 25° C., or from about 50,000 cP to about 60,000 cP at about 25° C. In some embodiments, the organically modified silicon dioxide preceramic polymer has a viscosity of from about 50,000 cP to about 60,000 cP at a temperature of about 25° C. In other embodiments, the organically modified silicon dioxide preceramic polymer has a viscosity of from about 1,000 cP to about 7,000 cP at about 25° C.

Such organically modified silicon dioxide preceramic polymers are commercially available from numerous sources including, but not limited to, Gelest, Inc. (Morrisville, Pa.). The organically modified silicon dioxide preceramic polymer may include, but is not limited to, VQM 135, VQM 135R, VQM 146, or combinations thereof.

The insulation precursor may also include a crosslinking agent, such as a radical initiator or a cationic initiator. The crosslinking agent initiates crosslinking of the polycarbosilane preceramic polymer and organically modified silicon dioxide preceramic polymer by reacting the vinyl groups with silicon-hydrogen groups in the insulation precursor. The radical initiator may be a peroxide compound or an azo compound used to cure (e.g., crosslink) the polycarbosilane preceramic polymer and the organically modified silicon dioxide preceramic polymer. The peroxide compound may include, but is not limited to, benzoyl peroxide, dicumyl peroxide, bis-(2,4-dichlorobenzoyl)-peroxide, or combinations thereof. The azo compound may include, but is not limited to, azobisisobutyronitrile. The cationic initiator may include a protonic acid, a Lewis acid/Friedel-Crafts catalyst (e.g., SnCl4, AlCl3, BF3, and TiCl4), carbenium ion salts (e.g., with trityl or tropylium cations), or through ionizing radiation.

The crosslinking agent may be present at an amount sufficient to react (e.g., crosslink) the polycarbosilane preceramic polymer and organically modified silicon dioxide preceramic polymer and at least partially depends on the polycarbosilane preceramic polymer and organically modified silicon dioxide preceramic polymer used, as well as on the desired cure time of the insulation precursor. In some embodiments, the insulation precursor may comprise from about 0.1% by weight to about 10% crosslinking agent by weight, such as from about 1% by weight to about 5% by weight, or even from about 2% by weight to about 4% by weight.

The insulation precursor may include optional components (e.g., additives) to provide desirable properties to the insulation material formed from the insulation precursor or change processing parameters. If present, the additive may be at least one compound that enhances at least one material property (e.g., tensile strength, elongation at break) of the insulation material to be formed from the insulation precursor. By way of example only, the additive may be a cure accelerator (e.g., a hydrosilylation catalyst, such as platinum, rhodium, ruthenium, iridium, palladium, nickel, cobalt, iron, manganese, or combinations thereof), an adhesion promoter, a lubricant, a filler, a pigment, or combinations thereof. Such additives are known in the art and are not described in detail herein. In some embodiments, the insulation precursor is substantially free of additives other than the crosslinking agent. Thus, the insulation precursor may consist essentially of or consist of the polycarbosilane preceramic polymer, organically modified silicon dioxide preceramic polymer, and the crosslinking agent.

The insulation precursor also includes at least one filler, such as a low-density filler (e.g., hollow glass microspheres, hollow polymeric microspheres, hollow ceramic microspheres, hollow polymeric fibers, hollow glass fibers, other hollow fibers, lightweight particles such as cork, etc.) or an ablation-enhancement filler (e.g., carbon fibers; chopped glass fiber; chopped aramid fiber (KEVLAR®); solid particles such as quartz, glass, talc, calcium carbonate, other ceramic or metal; fumed silica; surface-treated hydrophobic fumed silica, etc.). For example, fumed silica can be added as a viscosity modifier (i.e., a thixotrope) or an insulation enhancement (e.g., to provide better thermal stability or lower thermal ablation properties). The insulation precursor may include from about 1% to about 20% hollow glass microspheres by weight, such as from about 5% to about 10% by weight, or from about 6% to about 9% by weight. The hollow glass microspheres may exhibit a mean diameter from about 100 nm to about 5 mm, such as from about 1 μm to about 100 μm. Hollow glass microspheres may have a density, for example, from about 0.1 g/cm3 to about 0.6 g/cm3, and may be used to decrease the density of the insulation precursor (and ultimately, the density of insulation formed from the insulation precursor) by introducing voids into the insulation precursor. Thus, the insulation precursor including hollow glass microspheres may have a density of less than about 1.1 g/cm3, less than about 1.0 g/cm3, less than about 0.9 g/cm3, or even less than about 0.8 g/cm3. Hollow glass microspheres are commercially available from, e.g., Potters Industries, Inc. (Malvern, Pa.) under the names SPHERICEL® 110P8 and QCel 6042S or from 3M (Maplewood, Minn.) under the name 3M™ Glass Bubbles.

To avoid crushing the hollow glass microspheres during mixing, and thus eliminating the voids, the insulation precursor may be formulated to have a relatively low viscosity as compared to conventional EPDM precursors. For example, the insulation precursor may have a viscosity from about 200 cP (centipoise) to about 100,000 cP at 25° C., such as from about 5,000 cP to about 20,000 cP.

The insulation precursor may include from about 0.5% by weight to about 10% carbon fiber by weight, such as from about 1% by weight to about 5% by weight, or from about 2% by weight to about 4% by weight. Fillers such as carbon fibers and hollow glass microspheres may be used to change the ablation characteristics of insulation material formed from the insulation precursor. For example, and without being bound to any particular theory, individual carbon fibers may direct heat transfer in the direction of the fiber's longitudinal axis. In a material having carbon fibers randomly oriented in a matrix of insulation material, the carbon fibers may direct heat flow along random paths, rather than directly through the insulation material. Two important properties of an insulation material are thermal conductivity and ablation. Hollow glass microspheres lower the thermal conductivity and density. Carbon fibers lower the ablation characteristics, but increase thermal conductivity.

Insulating materials according to embodiments of the present disclosure may be formed by combining the silicon dioxide resin, the polycarbosilane, the crosslinking agent, the hollow glass microspheres, and the carbon fiber to form an insulation precursor. The formulation may also include a platinum catalyst to facilitate the crosslinking between the silicon dioxide resin, the polycarbosilane, and the crosslinking agent via hydrosilation chemistry. In other embodiments, crosslinking may be caused by radical initiation (e.g., thermal or photoinitiated) or other polymerization mechanisms (e.g., polyaddition, polycondensation, or click-chemistry). The insulation precursor may then be cured to form an insulation material comprising the hollow glass microspheres and the carbon fiber dispersed within a solid matrix. The solid matrix may be formed by cross-linking of the silicon dioxide resin and the polycarbosilane.

Multiple reactions may proceed simultaneously to cure the precursor formulation and form the solid matrix. For example, the silicon dioxide resin and the polycarbosilane may each react with the cross-linking compound. As the insulating material cures, the hollow glass microspheres and the carbon fiber may become confined within the solid matrix. The matrix may include a reaction product of the silicon carbide precursor resin and silicon dioxide precursor resin following cure and ceramification of the insulation precursor.

The insulation precursor may be formulated to have a relatively long pot life as compared to conventional insulation precursors. For example, if the insulation precursor uses the hydrosilation curing mechanism and a platinum catalyst, the insulation precursor may have a pot life at 25° C. (e.g., as measured by an increase in viscosity of no more than 10%) of at least about 15 days, at least about 30 days, or even at least about 45 days. Such a pot life may enable the preparation of the insulation precursor in advance for use in subsequent production, preparation of large batches of the insulation precursor for use in multiple final products, and preparation of the insulation precursor at a site remote from subsequent production (e.g., for safety or other reasons).

The insulation precursor may be cured to form the insulation material, such as by heating the insulation precursor to a temperature of at least about 38° C. (about 100° F.), at least about 66° C. (about 150° F.), at least about 93° C. about (200° F.), or even at least about 121° C. (about 250° F.). The insulation precursor may be formulated to cure in a time period between about 1 hour and 24 hours at typical cure temperatures (e.g., from about 38° C. (about 100° F.) to about 149° C. (about 300° F.)), such as from about 1 hour to about 6 hours, or from about 2 hours to about 4 hours. The cure rate of the insulation precursor may decrease with increased temperature, and thus, the cure time may be determined at least in part by the cure temperature. For example, at a cure temperature of 66° C., an insulation precursor of a selected formulation may cure in 4 hours; at a cure temperature of 121° C., the same insulation precursor may cure in 2 hours. The cure may be performed in a vacuum or an inert environment.

The cured insulation material may, optionally, be heated to another, higher temperature for a post-cure treatment. For example, the post-cure conditions may be selected to remove volatile materials from the cured insulation material to increase chemical stability or consistency of physical properties of the insulation material. For example, the cured insulation material may be post-cured at a temperature of at least about 149° C. (300° F.), at least about 177° C. (350° F.), or even at least about 204° C. (400° F.). The cured insulation may be post-cured for a time period between about 1 hour and 24 hours, such as from about 1 hour to about 6 hours, or from about 2 hours to about 4 hours. The post-cure may be performed in a vacuum or an inert environment.

The insulation may contain from about 1% by weight to about 20% by weight silicon carbide, such as from about 5% by weight to about 10% by weight, or from about 6% by weight to about 9% by weight. The silicon carbide may be a reaction product of the silicon carbide precursor resin, and may be formed during cure. The insulation may contain from about 40% by weight to about 90% by weight silicon dioxide, such as from about 50% by weight to about 85% by weight, or even from about 65% by weight to about 80% by weight. The silicon dioxide may be a reaction product of the silicon dioxide precursor resin, and may be formed during cure. The insulation may contain from about 1% by weight to about 20% by weight hollow glass microspheres, such as from about 5% by weight to about 10% by weight, or from about 6% by weight to about 9% by weight. The hollow glass microspheres may exhibit a mean diameter from about 100 nm to about 5 mm, such as from about 1 μm to about 100 μm. The insulation may contain from about 0.5% by weight to about 10% by weight carbon fiber, such as from about 1% by weight to about 5% by weight, or from about 2% by weight to about 4% by weight. The insulation may have a density of less than about 1.1 g/cm3, less than about 1.0 g/cm3, less than about 0.9 g/cm3, or even less than about 0.8 g/cm3; and a thermal conductivity at 25° C. of less than about 0.30 W/mK, less than about 0.25 W/mK, less than about 0.20 W/mK, or even less than about 0.15 W/mK.

FIG. 1 is a simplified cross-sectional view of a rocket motor 1000 (e.g., a solid rocket motor), in accordance with embodiments of the disclosure. The rocket motor 1000 may, for example, be configured to be a component (e.g., stage) of a larger assembly (e.g., a multi-stage rocket motor assembly). As shown in FIG. 1, the rocket motor 1000 includes a case 1002, a propellant structure 1004 disposed within the case 1002, and a nozzle assembly 1006 connected to an aft end of the case 1002. The rocket motor 1000 may also include one or more of a liner structure 1008 and an insulation material 1010 between the propellant structure 1004 and the case 1002. For example, the liner structure 1008 may be located on or over the propellant structure 1004, and the insulation material 1010 may be located on and between the liner structure 1008 and an inner surface of the case 1002. The components of the rocket motor 1000 may be formed using conventional processes and equipment, which are not described in detail herein. The insulation material according to embodiments of the disclosure may be used in the insulation material 1010.

The insulation material 1010 may be used on other regions of the rocket motor 1000, either internally, externally, or both. For example, the insulation material 1010 may provide ablative protection to an external bulk of the case 1002 and nozzle assembly 1006. Additionally, while the insulation material 1010 may be used for insulating a solid rocket motor and other large-scale motors, the insulation may also be used with other motors, such as biliquid, hybrid and reverse hybrid motors, or with rocket motor-propelled missiles.

In some embodiments, the rocket motor 1000 may be insulated by combining a silicon carbide precursor resin, a silicon dioxide precursor resin, and at least one filler to form an insulation precursor, as described above. The insulation precursor may be cured to form the insulation material 1010 comprising the hollow glass microspheres and the carbon fiber dispersed within a solid matrix. The insulation material 1010 may be bonded to an interior surface of the rocket motor case 1002. For example, in some embodiments, the insulation material 1010 may be secondarily bonded to the case 1002 after the insulation material 1010 has been cured, such as with a silicone RTV adhesive. In other embodiments, the insulation material 1010 may be bonded to the case 1002 as the insulation material 1010 cures. The liner structure 1008 may be bonded to the insulation material 1010, and the propellant structure 1004 may be formed by casting and curing solid propellant within the case 1002. The insulation material 1010 may protect the case 1002 as the propellant burns inside the case 1002 of the rocket motor 1000.

In some embodiments, at least a portion of the solid matrix of the insulation material 1010 may be converted to a glassy solid while the propellant structure 1004 burns within the case 1002 of the rocket motor 1000. Without being bound to any particular theory, it is believed that at least some of the silicon carbide may become oxidized to form silicon dioxide. The silicon dioxide may act as an additional insulation material before being ablated away. Thus, the reaction may yield better ablative properties (i.e., resistance to ablation) than conventional insulation materials.

In addition to being used as insulation in rocket motors, the insulation may be used in other articles where protection from heat and gases is desired. For example, the insulation may be used for heat and gas protection in under-the-hood applications in automobiles. The insulation may also be used in conveyor belts and in noise-damping applications in automobile and other fields. In addition, the insulation may be used in routine rubber applications including, but not limited to, such applications as hoses, gaskets, seals, isolators and mounts, cushions, air emission hoses, and dock fenders.

The following examples serve to explain embodiments of the insulation precursor, the insulating materials, and methods of forming the insulating materials in more detail. These examples are not to be construed as being exhaustive or exclusive as to the scope of the disclosure.

EXAMPLES

Example 1: Preparation of Insulation with Glass Microspheres

An insulation precursor was prepared by mixing 500 parts of an organically modified silicon dioxide preceramic polymer commercially available from Gelest, Inc., as VQM-146; 55.5 parts of a polycarbosilane preceramic polymer commercially available from EEMS, LLC as CSO-110; 25 parts of a crosslinking resin commercially available from Gelest, Inc., as HQM-105; 5 parts of a platinum catalyst commercially available from EEMS as CLC-PL005; 19.45 parts of glycidyl methacrylate (an adhesion promoter) commercially available from Sigma Aldrich (St. Louis, Mo.); and 54.5 parts hollow glass microspheres commercially available from 3M as 3M™ Glass Bubbles H20/1000.

The insulation precursor included 75.79 wt % silicon dioxide polymer, 8.41 wt % polycarbosilane, 3.79 wt % crosslinking resin, 0.83 wt % platinum, 2.95 wt % adhesion promoter, and 8.26 wt % hollow glass microspheres.

The insulation precursor was spread into a layer approximately ⅛ inch (3.2 mm) thick, and was exposed to a cure temperature of 121° C. (250° F.) for 2 hours to cure the insulation precursor. The resulting insulation material was post-cured at 204° C. (400° F.) for 4 hours.

The insulation material was determined to have a density of 0.78 g/cm3 and a thermal conductivity at 25° C. of about 0.13 W/mK.

Example 2: Preparation of Insulation with Glass Microspheres and Carbon Fiber

An insulation precursor was prepared by mixing 500 parts of an organically modified silicon dioxide preceramic polymer commercially available from Gelest, Inc., as VQM-146; 55.5 parts of a polycarbosilane preceramic polymer commercially available from EEMS, LLC as CSO-110; 25 parts of a crosslinking resin commercially available from Gelest, Inc., as HQM-105; 5 parts of a platinum catalyst commercially available from EEMS as CLC-PL005; 19.45 parts of glycidyl methacrylate, commercially available from Sigma Aldrich; 54.5 parts hollow glass microspheres commercially available from 3M as 3M™ Glass Bubbles H20/1000; and 27.5 parts chopped carbon fiber commercially available from Zoltek (St. Louis, Mo.) as Zoltek PX35.

The insulation precursor included 72.73 wt % silicon dioxide polymer, 8.07 wt % polycarbosilane, 3.64 wt % crosslinking resin, 0.80 wt % platinum, 2.83 wt % adhesion promoter, 7.93 wt % hollow glass microspheres, and 4.00 wt % carbon fiber.

The insulation precursor was spread into a layer approximately ⅛ inch (3.2 mm) thick, and was exposed to a cure temperature of 121° C. (250° F.) for 2 hours to cure the insulation precursor. The resulting insulation material was post-cured at 204° C. (400° F.) for 4 hours.

The insulation material was determined to have a density of 0.758 g/cm3 and a thermal conductivity at 25° C. of about 0.14 W/mK.

Example 3: Preparation of Insulation with Glass Microspheres and Carbon Black An insulation precursor was prepared by mixing 350 parts of an organically modified silicon dioxide preceramic polymer commercially available from Gelest, Inc., as VQM-146; 38.85 parts of a polycarbosilane preceramic polymer commercially available from EEMS, LLC as CSO-110; 17.5 parts of a crosslinking resin commercially available from Gelest, Inc., as HQM-105; 3.85 parts of a platinum catalyst commercially available from EEMS as CLC-PL005; 13.62 parts of glycidyl methacrylate, commercially available from Sigma Aldrich; 38.15 parts hollow glass microspheres commercially available from 3M as 3M™ Glass Bubbles H20/1000; and 210 parts carbon black.

The insulation precursor included 52.09 wt % silicon dioxide polymer, 5.78 wt % polycarbosilane, 2.60 wt % crosslinking resin, 0.57 wt % platinum, 2.03 wt % adhesion promoter, 5.68 wt % hollow glass microspheres, and 31.25 wt % carbon fiber.

The insulation precursor was spread into a layer approximately ⅛ inch (3.2 mm) thick, and was exposed to a cure temperature of 121° C. (250° F.) for 2 hours to cure the insulation precursor. The resulting insulation material was post-cured at 204° C. (400° F.) for 4 hours.

The insulation material was determined to have a density of 0.88 g/cm3 and a thermal conductivity at 25° C. of about 0.23 W/mK.

Example 4: Baseline Kevlar-filled EPDM

A conventional insulation material was prepared having ethylene propylene diene monomer and Kevlar fibers. The conventional insulation material was determined to have a density of 1.163 g/cm3 and a thermal conductivity at 25° C. of about 0.19 W/mK.

Example 5

Samples of the insulation materials formed in Examples 1 through 4 were cut into square samples for testing. Samples of the materials in Examples 1, 2, and 4 were subjected to a flame for 30 seconds at three different intensities: 115 BTU/ft2s, 210 BTU/ft2s, and 475 BTU/ft2s. Samples of the material in Example 3 were subjected to a flame for 30 seconds at two different intensities: 115 BTU/ft2s and 210 BTU/ft2s. The surface temperature of each sample at the end of the 30 seconds was measured, as were the density and mass loss of each sample after the test. The results appear in Table 1 below.

TABLE 1

| Insulation Material | Heat Flux (BTU/ft$^2$s) | Surface Temperature (° F.) | Sample Density (g/cm$^3$) | Mass Loss (%) |
|---|---|---|---|---|
| Example 1: Hollow | 115 | 2,465 | 0.79 | 4.19% |
| Glass Microspheres | 210 | 3,092 | 0.78 | 21.91% |
|  | 475 | 3,330 | 0.78 | 33.77% |
| Example 2: Hollow | 115 | 2,461 | 0.75 | 1.33% |
| Glass Microspheres | 210 | 3,146 | 0.74 | 4.44% |
| and Carbon Fibers | 475 | 3,380 | 0.78 | 16.40% |
| Example 3: Hollow | 115 | 2,521 | 0.94 | 3.73% |
| Glass Microspheres and Carbon Black | 210 | 3,015 | 0.95 | 3.62% |
| Example 4: Baseline | 115 | 2,496 | 1.10 | 3.51% |
| Kevlar-filled EPDM | 210 | 3,266 | 1.09 | 15.05% |
|  | 475 | 3,840 | 1.10 | 28.15% |

The data in Table 1 indicate that the insulation material formed in Examples 1 through 3 each experienced lower surface temperatures under certain conditions than the baseline insulation material formed in Example 4. Furthermore, the material formed in Example 2, having hollow glass microspheres and carbon fibers dispersed in a matrix, experienced a lower mass loss during the testing than the baseline material, indicating that this insulation material is more stable at the test conditions than the baseline material. That is, the material formed in Example 2 may be characterized as lower-ablating than the baseline material, and may be used in environments in which the baseline material would experience an unacceptable amount of ablation. Furthermore, the materials formed in Examples 1 through 3 exhibited lower density than the baseline material, and the materials formed in Examples 1 and 2 had lower thermal conductivity.

While the invention is susceptible to various modifications and alternative forms, specific embodiments have been shown by way of example in the drawings and have been described in detail herein. However, the invention is not intended to be limited to the particular forms disclosed. Rather, the invention is to cover all modifications, equivalents, and alternatives falling within the scope of the invention as defined by the following appended claims and their legal equivalents.

What is claimed is:

1. An insulation precursor, comprising:
    a silicon carbide precursor resin;
    a silicon dioxide precursor resin; and
    at least one filler material selected from the group consisting of a low density filler and an ablation enhancement filler.

2. The insulation precursor of claim 1, wherein the silicon dioxide precursor resin comprises an organically modified silicon dioxide preceramic polymer.

3. The insulation precursor of claim 1, further comprising a catalyst.

4. The insulation precursor of claim 1, further comprising an adhesion promoter.

5. The insulation precursor of claim 1, wherein the silicon dioxide precursor resin exhibits a density from about 0.95 g/cm$^3$ to about 1.05 g/cm$^3$.

6. The insulation precursor of claim 1, wherein the silicon carbide precursor resin exhibits a density from about 1.10 g/cm$^3$ to about 1.25 g/cm$^3$.

7. The insulation precursor of claim 1, wherein the insulation precursor comprises:
    from about 5% to about 10% silicon carbide precursor resin by weight;
    from about 50% to about 85% silicon dioxide precursor resin by weight;
    from about 1% to about 5% crosslinking agent by weight;
    from about 5% to about 10% hollow glass microspheres by weight; and
    from about 1% to about 5% carbon fiber by weight.

8. The insulation precursor of claim 1, wherein the insulation precursor consists essentially of:
   the silicon carbide precursor resin;
   the silicon dioxide precursor resin;
   a crosslinking agent;
   hollow glass microspheres;
   carbon fiber;
   a catalyst; and
   an adhesion promoter.

9. The insulation precursor of claim 1, wherein the insulation precursor exhibits a viscosity of less than about 100,000 cP at 25° C.

10. The insulation precursor of claim 1, wherein the insulation precursor exhibits a pot life of at least about 30 days at 25° C.

11. The insulation precursor of claim 1, wherein the insulation precursor comprises from about 40% by weight to about 90% by weight the silicon dioxide precursor resin.

12. The insulation precursor of claim 1, wherein the at least one filler material comprises the ablation enhancement filler, the ablation enhancement filler comprising carbon fiber.

* * * * *